(12) United States Patent
Chang et al.

(10) Patent No.: US 10,597,479 B2
(45) Date of Patent: Mar. 24, 2020

(54) AMPHIPHILIC BRANCHED POLYDIORGANOSILOXANE MACROMERS

(71) Applicant: Novartis AG, Basel (CH)

(72) Inventors: Frank Chang, Cumming, GA (US); Jinyu Huang, Ridgewood, NJ (US); Troy Vernon Holland, Suwanee, GA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/175,904

(22) Filed: Oct. 31, 2018

(65) Prior Publication Data

US 2019/0062485 A1    Feb. 28, 2019

Related U.S. Application Data

(62) Division of application No. 15/376,707, filed on Dec. 13, 2016, now Pat. No. 10,138,316.

(60) Provisional application No. 62/267,314, filed on Dec. 15, 2015.

(51) Int. Cl.

| C08L 101/14 | (2006.01) |
|---|---|
| C08L 83/04 | (2006.01) |
| C08F 290/06 | (2006.01) |
| G02B 1/04 | (2006.01) |
| C08G 77/20 | (2006.01) |
| C08F 283/12 | (2006.01) |
| C08F 220/40 | (2006.01) |

(52) U.S. Cl.
CPC ........ *C08F 290/068* (2013.01); *C08F 220/40* (2013.01); *C08F 283/124* (2013.01); *C08G 77/20* (2013.01); *G02B 1/043* (2013.01); *C08F 2438/01* (2013.01); *C08G 2210/00* (2013.01); *C08L 2312/06* (2013.01)

(58) Field of Classification Search
None
See application file for complete search history.

(56) References Cited

U.S. PATENT DOCUMENTS

| 3,700,573 A * | 10/1972 | Laizier et al. ........ | C08F 283/12 |
|---|---|---|---|
| | | | 522/138 |
| 4,260,725 A * | 4/1981 | Keogh ................... | C08F 230/08 |
| | | | 264/1.1 |
| 5,397,848 A * | 3/1995 | Yang ....................... | A61L 27/18 |
| | | | 523/106 |
| 5,760,100 A * | 6/1998 | Nicolson ................ | G02C 7/049 |
| | | | 351/159.33 |
| 6,331,578 B1 * | 12/2001 | Turner ................... | C08F 283/12 |
| | | | 523/105 |
| 8,835,525 B2 * | 9/2014 | Kuyu ...................... | C08G 77/42 |
| | | | 523/107 |
| 9,052,440 B2 * | 6/2015 | Kuyu ...................... | C08G 77/42 |
| 2003/0162862 A1 * | 8/2003 | McCabe ................. | A61L 27/18 |
| | | | 523/106 |
| 2003/0188841 A1 * | 10/2003 | Buder ..................... | A61K 8/0208 |
| | | | 162/179 |
| 2007/0066706 A1 * | 3/2007 | Manesis ................. | G02B 1/043 |
| | | | 523/106 |
| 2009/0234089 A1 * | 9/2009 | Ueyama ................... | C08F 8/42 |
| | | | 526/279 |
| 2010/0063237 A1 * | 3/2010 | Dhruv ........................ | C08J 3/20 |
| | | | 528/32 |
| 2010/0089540 A1 * | 4/2010 | Buder ..................... | A61K 8/0208 |
| | | | 162/162 |
| 2010/0152403 A1 * | 6/2010 | Ma ............................ | C08F 4/00 |
| | | | 528/12 |
| 2012/0088844 A1 * | 4/2012 | Kuyu ...................... | C08G 77/42 |
| | | | 514/772.3 |
| 2014/0018465 A1 * | 1/2014 | Liu ......................... | G02B 1/043 |
| | | | 523/107 |
| 2014/0350124 A1 * | 11/2014 | Kuyu ...................... | C08G 77/42 |
| | | | 514/772.1 |
| 2017/0166675 A1 * | 6/2017 | Chang .................. | C08F 290/068 |
| 2019/0062485 A1 * | 2/2019 | Chang .................. | C08F 290/068 |

FOREIGN PATENT DOCUMENTS

| EP | 2443485 B1 | 11/2017 |
|---|---|---|
| JP | S63070221 A | 3/1988 |

* cited by examiner

*Primary Examiner* — Peter A Salamon
(74) *Attorney, Agent, or Firm* — Jian Zhou

(57) ABSTRACT

The invention provides a class of amphiphilic branched macromers and the uses thereof. An amphiphilic branched polydiorganosiloxane macromer of the invention is produced from an α,ω-dimethacryloyl-terminated polydiorganosiloxane vinylic crosslinker comprising one or more ATRP-containing siloxane units having one substituent having an ATRP initiator by ATRP polymerization of one or more hydrophilic vinylic monomers. It comprises at least two polydiorganosiloxane polymer chains each having at most two terminal methacryloxy groups, dangling hydrophilic polymer chains each having a polymerizable or non-polymerizable terminal group, and one or more hydrophilic polymer chains as linkages between two polydiorganosiloxane chains. The present invention is also related to a silicone hydrogel contact lens, which comprises units derived from a polydiorganosiloxane-containing amphiphilic branched macromer of the invention.

16 Claims, No Drawings

AMPHIPHILIC BRANCHED POLYDIORGANOSILOXANE MACROMERS

This application is a divisional application of U.S. patent application Ser. No. 15/376,707 filed 13 Dec. 2016, which claims the benefit under 35 USC § 119 (e) of U.S. provisional application No. 62/267,314 filed 15 Dec. 2015, herein incorporated by reference in its entirety.

The present invention is related to a class of amphiphilic branched polydiorganosiloxane macromers and uses thereof. In particular, the present invention is related to silicone hydrogel contact lenses made from a lens formulation including a amphiphilic branched polydiorganosiloxane macromer.

BACKGROUND

Most commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (Alcon), as illustrated in U.S. Pat. Nos. 5,508,317, 5,789,464, 5,849,810, and 6,800,225, which are incorporated by reference in their entireties. The Lightstream Technology™ involves reusable molds produced in high precision and curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

U.S. Pat. No. 8,163,206 (herein incorporated by reference in its entirety) discloses a method for making silicone hydrogel contact lenses from a monomer mixture (i.e., a lens-forming composition) according to the Lightstream Technology™. However, it is discovered here that in addition to relatively longer curing time, relatively significant shrinkage during curing of the monomer mixture in molds can occur that may greatly impede the application of the Lightstream Technology™ in the manufacturing of silicone hydrogel contact lenses.

U.S. Pat. Nos. 6,039,913, 6,043,328, 7,091,283, 7,268,189, 7,238,750, 7,521,519, 8,003,710, 8,044,111, 8,048,968, 8,071,658, 8,071,703, 8,404,759, 8,404,783, 8,524,800 (which are incorporated by reference in their entireties) discloses silicone-containing macromers (or prepolymers) for making silicone hydrogel contact lenses according to Lightstream Technology™. However, those types of prepolymers disclosed in the above patents and patent applications may have some practical limitations in their use for making silicone hydrogel contact lenses according to Lightstream Technology™.

Therefore, there is still a need for new amphiphilic macromers suitable for making silicone hydrogel contact lenses according to the Lightstream Technology™.

SUMMARY OF THE INVENTION

The present invention, in one aspect, provides an amphiphilic branched polydiorganosiloxane macromer. The amphiphilic branched polydiorganosiloxane macromer of the invention comprises: (1) at least one first hydrophilic chain; (2) at least one second hydrophilic polymer chain; (3) at least first polydiorganosiloxane polymer chain having two terminal methacryloyl group; (4) at least one second polydiorganosiloxane polymer chain at least one end of which is covalently connected to the second hydrophilic polymer chain; wherein the first and second polydiorganosiloxane chains are derived from an $\alpha,\omega$-dimethacryloyl-terminated polydiorganosiloxane vinylic crosslinker comprising one or more ATRP-containing siloxane units having one substituent having an ATRP initiator moiety, wherein the first hydrophilic chain is anchored covalently onto one single ATRP-containing siloxane unit of the first or second polydiorganosiloxane chain at one of the two ends of the first hydrophilic polymer chain and has one first terminal group at the other one of the two ends of the first hydrophilic polymer chain; wherein the second hydrophilic polymer chain is (a) anchored covalently onto one single ATRP-containing siloxane unit of the first polydiorganosiloxane chain at one of the two ends of the second hydrophilic polymer chain, (b) has one second terminal group at the other one of the two ends of the second hydrophilic polymer chain, and (c) is covalently connected to covalently connected to one of the two ends of the second polydiorganosiloxane chain, wherein the first and second terminal groups independent of each other are (meth)acryloxy group, (meth)acryloxy-$C_2$-$C_4$ alkoxy group, (meth)acrylamido-$C_2$-$C_4$ alkoxy group, (meth)acryloxy-$C_2$-$C_4$ alkylamino group, (meth)acrylamido-$C_2$-$C_4$ alkylamino group, $C_1$-$C_6$ substituted or unsubstituted alkoxy group, $C_2$-$C_6$ substituted or unsubstituted alkanoyloxy group, or $C_1$-$C_6$ substituted or unsubstituted alkylamino group, wherein the first and second hydrophilic polymer chains are composed of monomeric units of at least one hydrophilic vinylic monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, hydroxyethyl (meth)acrylate, hydroxyethyl (meth)acrylamide, hydroxypropyl (meth)acrylamide, glycerol methacrylate (GMA), polyethylene glycol (meth)acrylate, polyethylene glycol $C_1$-$C_4$-alkyl ether (meth)acrylate having a number average molecular weight of up to 1500, and mixtures thereof.

In another aspect, the invention provides a silicone hydrogel contact lens comprising a crosslinked polymeric material comprising: units of an amphiphilic branched polydiorganosiloxane macromer of the invention as described above, wherein the silicone hydrogel contact lens, when being fully hydrated, has an oxygen permeability (Dk) of at least about 70 barrers (preferably at least about 80 barrers, more preferably at least about 90 barrers, even more preferably at least about 100 barrers), a water content of from about 25% to about 70% by weight (preferably from about 30% to about 65% by weight, more preferably from about 35% to about 60% by weight, even more preferably from about 40% to about 55% by weight), an elastic modulus of from about 0.20 MPa to about 1.2 MPa (preferably from about 0.25 MPa to about 1.0 MPa, more preferably from about 0.3 MPa to about 0.9 MPa, even more preferably from about 0.4 MPa to about 0.8 MPa).

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises at least one amphiphilic branched polydiorganosiloxane macromer of the invention as described above and at least one free-radical initiator; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which is insoluble in water, but can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

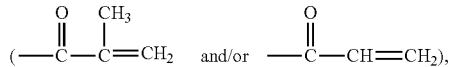

allyl, vinyl, styrenyl, or other C=C containing groups.

The term "ene group" refers to a monovalent radical comprising $CH_2$=CH— that is not covalently attached to an oxygen or nitrogen atom or a carbonyl group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acryloxy" refers to a group of

The term "(meth)acrylamido" refers to a group of

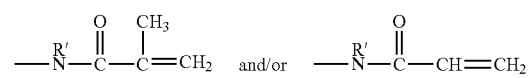

in which R' is hydrogen or $C_1$-$C_{10}$-alkyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has an average molecular weights greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxy (—COOH), —NH$_2$, sulfhydryl, $C_1$-$C_4$ alkyl, $C_1$-$C_4$ alkoxy (—OR'), $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, the term "siloxane unit" refers to a divalent radical of —Si($^1$R$^2$R)—O— which has only two substituents, $^1$R and $^2$R which independently of each other are monovalent organic radicals and covalently linked to the silicon atom of the siloxane unit.

The term "monovalent organic radical" refers to a monovalent radical obtained by removing a hydrogen atom from an organic compound.

In this application, the term "methyl substituent" in reference to a siloxane unit refers to a methyl radical directly linked to the silicon atom of the siloxane unit; the term "monovalent $C_5$-$C_{30}$ organic radical substituent" in reference to a siloxane unit refers to a monovalent organic radical which comprises 5 to 30 carbon atoms and is directly linked to the silicon atom of the siloxane unit.

In this application, the term "hydrophilized siloxane unit" refers to a siloxane unit in which one of the two substituents on the silicon atom of the siloxane unit is monovalent $C_5$-$C_{30}$ organic radical having at least one hydrophilic group or moiety (such as, hydroxyl, methoxy, carboxyl or amino group, or amide bond).

In this application, a "hydrophilized polydiorganosiloxane vinylic crosslinker" refers to a polydiorganosiloxane vinylic crosslinker comprising at least one hydrophilized siloxane unit.

As used herein, the term "multiple" refers to three or more.

A "vinylic crosslinker" refers to a compound having at least two ethylenically-unsaturated groups. A "vinylic crosslinking agent" refers to a compound with two or more ethylenically unsaturated groups and with molecular weight less than 700 Daltons.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "polymerizable UV-absorbing agent" or "UV-absorbing vinylic monomer" refers to a compound comprising an ethylenically-unsaturated group and a UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is any radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment/modification process prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Pat. Appl. Pub. Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures described in Example 1 of U.S. patent application publication No. 2012/0026457 A1 (herein incorporated by reference in its entirety). Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The term "ATRP" refers to atom-transfer radical polymerization, as understood by a person skilled in the art.

As used in this application, the term "clear" in reference to a lens-forming composition means that the lens-forming composition is a transparent solution or liquid mixture (i.e., having a light transmissibility of 85% or greater, preferably 90% or greater in the range between 400 to 700 nm).

The invention generally is related to a class of amphiphilic branched macromers and the uses thereof. An amphiphilic branched polydiorganosiloxane macromer of the invention is produced from an α,ω-dimethacryloyl-terminated polydiorganosiloxane vinylic crosslinker comprising one or more ATRP-containing siloxane units having one substituent having an ATRP initiator by ATRP polymerization of one or more hydrophilic vinylic monomers. It comprises at least two polydiorganosiloxane polymer chains each having at most two terminal methacryloyl groups, dangling hydrophilic polymer chains each having a polymerizable or non-polymerizable terminal group, and one or more hydrophilic polymer chains as linkages between two polydiorganosiloxane chains.

There are several potential unique features associated with use of an amphiphilic branched polydiorganosiloxane macromer of the invention in making silicone hydrogel contact lens. First, an amphiphilic branched polydiorganosiloxane macromer of the invention has well-defined structures, controlled composition, and molecular weight. The synthesis of such macromer is reproducible. Lenses made from such macromer can have consistent properties. Second, a lens-forming formulation (polymerizable composition) can be a solution of the macromer which has been substantially purified (i.e., removing substantially starting materials for making the prepolymer). No lens extraction is necessary after curing of the lens. Third, an amphiphilic branched polydiorganosiloxane macromer of the invention can be cured actinically on a timescale of seconds. As such, an amphiphilic branched polydiorganosiloxane macromer of the invention can fully utilize the advantages provided by the Lightstream Technology™ (Alcon) in make silicone hydrogel contact lenses at a relatively lower cost and at high consistency and high fidelity to the original lens design.

The present invention, in one aspect, provides an amphiphilic branched polydiorganosiloxane macromer. The amphiphilic branched macromer of the invention comprises: (1) at least one first hydrophilic chain; (2) at least one second hydrophilic polymer chain; (3) at least first polydiorganosiloxane polymer chain having two terminal methacryloyl group; (4) at least one second polydiorganosiloxane polymer chain at least one end of which is covalently connected to the second hydrophilic polymer chain; wherein the first and second polydiorganosiloxane chains are derived from an α,ω-dimethacryloyl-terminated polydiorganosiloxane vinylic crosslinker comprising one or more ATRP-containing siloxane units having one substituent having an ATRP initiator, wherein the first hydrophilic chain is anchored covalently onto one single ATRP-containing siloxane unit of the first or second polydiorganosiloxane chain at one of the two ends of the first hydrophilic polymer chain and has one first terminal group at the other one of the two ends of the first hydrophilic polymer chain; wherein the second hydrophilic polymer chain is (a) anchored covalently onto one single ATRP-containing siloxane unit of the first polydiorganosiloxane chain at one of the two ends of the second hydrophilic polymer chain, (b) has one second terminal group at the other one of the two ends of the second hydrophilic polymer chain, and (c) is covalently connected to covalently connected to one of the two ends of the second polydiorganosiloxane chain, wherein the first and second terminal groups independent of each other are (meth)acryloxy group, (meth)acryloxy-$C_2$-$C_4$ alkoxy group, (meth)acrylamido-$C_2$-$C_4$ alkoxy group, (meth)acryloxy-$C_2$-$C_4$ alkylamino group, (meth)acrylamido-$C_2$-$C_4$ alkylamino group, $C_1$-$C_6$ substituted or unsubstituted alkoxy group, $C_2$-$C_6$ substituted or unsubstituted alkanoyloxy group, or $C_1$-$C_6$ substituted or unsubstituted alkylamino group, wherein the first and second hydrophilic polymer chains are composed of monomeric units of at least one hydrophilic vinylic monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, hydroxyethyl (meth)acrylate, hydroxyethyl (meth)acrylamide, hydroxypropyl (meth)acrylamide, glycerol methacrylate (GMA), polyethylene glycol (meth)acrylate, polyethylene glycol $C_1$-$C_4$-alkyl ether (meth)acrylate having a number average molecular weight of up to 1500, and mixtures thereof (preferably selected from the group consisting of N-vinylpyrrolidone, N,N-dimethyl (meth)acrylamide, (meth)acrylamide, N-vinyl-N-methyl acetamide, hydroxyethyl (meth)acrylate, hydroxyethyl (meth)acrylamide, glycerol methacrylate, polyethylene glycol $C_1$-$C_4$-alkyl ether (meth)acrylate having a number average molecular weight of up to 1500, and combinations thereof).

In a preferred embodiment, the α,ω-dimethacryloyl-terminated polydiorganosiloxane vinylic crosslinker comprising one or more ATRP-containing siloxane units having one substituent having an ATRP initiator has formula (1)

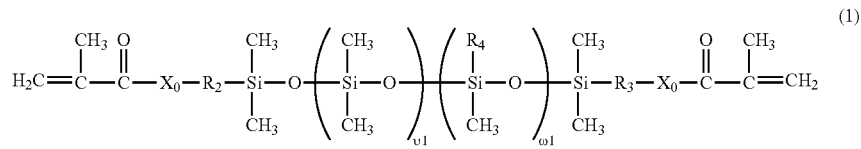

(1)

in which: $X_0$ is O or NR' in which R' is hydrogel or $C_1$-$C_{10}$ alkyl, $\upsilon 1$ is an integer of from 30 to 500 and $\omega 1$ is an integer of from 1 to 75, provided that $\omega 1/\upsilon 1$ is from about 0.003 to about 0.20 (preferably from about 0.005 to about 0.080, even more preferably from about 0.01 to about 0.030); $R_2$ and $R_3$ independently of each other are a substituted or unsubstituted $C_2$-$C_6$ alkylene divalent radical or a divalent radical of —$R_5$—O—$R_6$— in which $R_5$ and $R_6$ independently of each other are a substituted or unsubstituted $C_2$-$C_6$ alkylene divalent radical; $R_4$ is of formula (2) or (3)

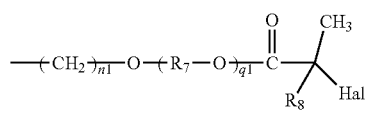

(2)

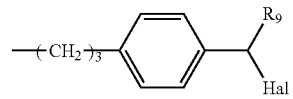

(3)

in which: q1 is zero or 1; n1 is an integer of 3 to 9; $R_7$ is $C_2$-$C_6$ substituted or unsubstituted alkylene diradical; $R_8$ and $R_9$ independent of each other are hydrogen or methyl (preferably methyl); Hal is Cl or Br (preferably Br).

An α,ω-dimethacryloyl-terminated polydiorganosiloxane vinylic crosslinker of formula (1) in which $R_4$ is of formula (2) can be prepared in a three-step process.

In the first step, a hydrosiloxane-containing polydiorganosiloxane of formula (4)

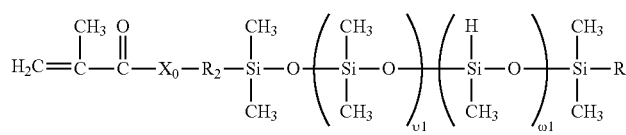

(4)

in which $X_0$, $R_2$ and $R_3$ are as defined above, is prepared according to any methods known to a person skilled in the art. As an illustrative example, a hydrosiloxane-containing polydiorganosiloxane of formula (4) can be prepared from polymerization of a mixture of octamethylcyclotetrasiloxane (D4) and 1,3,5,7-tetramethylcyclotetrasiloxane (H4) in presence of 1,3-bis[3-(meth)acryloxypropyl]tetramethyldisiloxane (or the like) as a chain end block and in the presence of a catalyst. By controlling the molar ratio of D4 to H4, a desired value of $\upsilon 1/\omega 1$ can be obtained.

In the second step, the hydrosiloxane-containing polydiorganosiloxane of formula (4) is reacted with with an ene monomer having a hydroxyl group, in a platinum-catalyzed hydrosilylation reaction as known to a person skilled in the art, to obtain a polydiorganosiloxane containing hydrophilized siloxane units each comprising one organic substituent having a hydroxyl group. The ene monomer having a hydroxyl group preferred is 3-buten-1-ol, 4-penten-1-ol, 5-hexen-1-ol, 6-hepten-1-ol, allyloxyethanol, 1-allyloxy-2-propanol, allyloxy propanol, 4-allyloxy-1-butanol, and 4-allyloxy-2-methyl-1-butanol. The above-listed ene monomers are commercially available.

In the third step, the obtained polydiorganosiloxane containing hydrophilized siloxane units each comprising one organic substituent having a hydroxyl group is reacted with a commercially-available ATRP initiator of

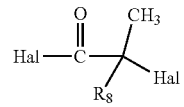

(e.g., 2-bromoisobutyryl bromide, 2-chloroisobutyryl chloride, 2-bromopropionyl bromide, 2-chloropropionyl chloride) or

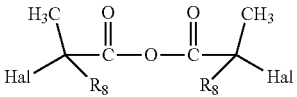

(e.g., 2-bromobutyric anhydride, 2-chlorobutyric anhydride, 2-bromopropionic anhydride, 2-chloropropionic anhydride), to obtain an α,ω-dimethacryloxy-terminated polydiorganosiloxane vinylic crosslinker of formula (1).

An α,ω-dimethacryloxy-terminated polydiorganosiloxane vinylic crosslinker of formula (1) in which $R_4$ is of formula (3) can be prepared in a two-step process.

In the first step, a hydrosiloxane-containing polydiorganosiloxane of formula (4) (as defined above) is prepared as described above.

In the second step, the hydrosiloxane-containing polydiorganosiloxane of formula (4) is reacted with with an ally-containing ATRP initiator, such as, 1-allyl-4-chloromethylbenzene, 1-allyl-4-bromomethylbenzene, 1-allyl-4-(1-chloroethyl) benzene, or 1-allyl-4-(1-bromoethyl) benzene, to obtain an α,ω-dimethacryloxy-terminated polydiorganosiloxane vinylic crosslinker of formula (1).

An amphiphilic branched polydiorganosiloxane macromer of the invention can be prepared by atom-transfer-radical-polymerization (ATRP) of one or more hydrophilic vinylic monomers using an α,ω-dimethacryloyl-terminated polydiorganosiloxane vinylic crosslinker of formula (1) as ATRP initiator in the presence of a catalyst (e.g., cuprous halide—CuBr). A person skilled in the art know well how to carry out ATRP polymerization of one or more hydrophilic vinylic monomer (e.g., see, Coessens, et al., "Functional polymers by atom transfer radical polymerization", Prog. Polym. Sci. 26 (2001): 337-377, herein incorporated by reference in its entirety). Depending on the monomer concentration and conversion, the amount of reaction of methacrylates from the PDMS can be controlled, as illustrated by the following Scheme.

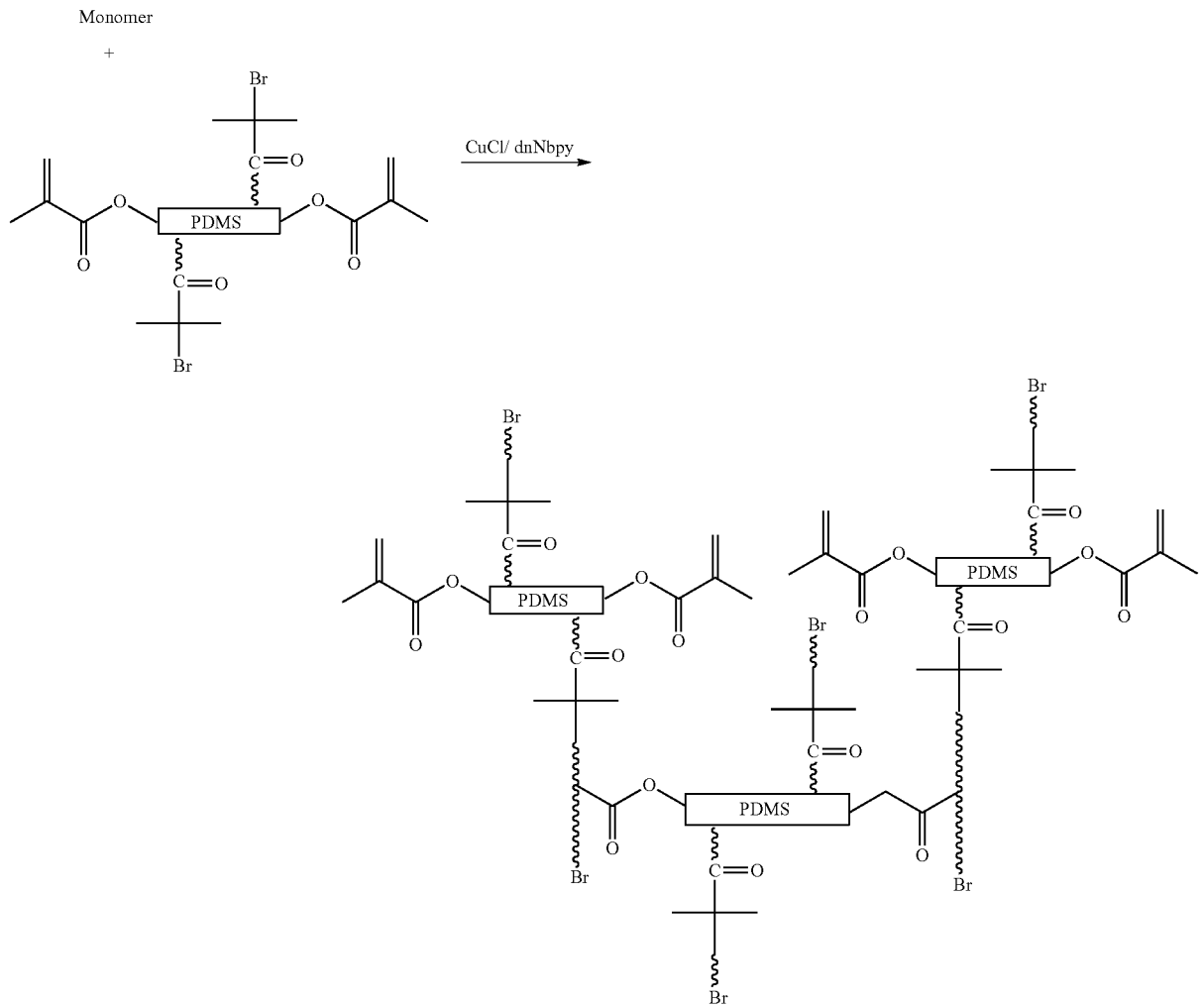

Each of the first and second hydrophilic polymer chains in the resultant amphiphilic polymer are the ATRP-graft-polymerization products extending out from each ATRP-containing siloxane units, and is terminated with one sole halide group (chloride or bromide). The terminal halide group then can react with a compound with a reactive functional group (e.g., with (meth)acrylic acid to form a (meth)acryloxy terminal group, with hydroxyalkyl (meth)acrylate or (meth) acrylamide to form a (meth)acryloxyalkoxy or (meth)acrylamidoalkoxy terminal group, with aminoalkyl (meth)acrylate or (meth)acrylamide to form a (meth)acryloxyalkylamino or (meth)acrylamidoalkylamino terminal group, with alkyl alcohol to form an alkoxy terminal group, with alkanoic acid to form an alkanoyloxy terminal group, with alkylamine to form an alkylamino terminal group) as known to a person skilled in the art.

An amphiphilic branched polydiorganosiloxane macromer of the invention as described above can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: units of an amphiphilic branched polydiorganosiloxane macromer of the invention as described above, wherein the silicone hydrogel contact lens, when being fully hydrated, has an oxygen permeability (Dk) of at least about 70 barrers (preferably at least about 80 barrers, more preferably at least about 90 barrers, even more preferably at least about 100 barrers), a water content of from about 25% to about 70% by weight (preferably from about 30% to about 65% by weight, more preferably from about 35% to about 60% by weight, even more preferably from about 40% to about 55% by weight), an elastic modulus of from about 0.20 MPa to about 1.2 MPa (preferably from about 0.25 MPa to about 1.0 MPa, more preferably from about 0.3 MPa to about 0.9 MPa, even more preferably from about 0.4 MPa to about 0.8 MPa). The modulus can be measured using a method in accordance with ANSI Z80.20 standard.

A person skilled in the art knows well how to measure the oxygen permeability, oxygen transmissibility, water content, elastic modulus, and lens diameter of silicone hydrogel contact lenses. These lens properties have been reported by all manufacturers for their silicone hydrogel contact lens products.

Various embodiments of a polydiorganosiloxane-containing amphiphilic branched macromer of the invention are described above and should be incorporated into this aspect of the invention.

In accordance with the invention, the crosslinked polymeric material of a silicone hydrogel contact lens of the invention can further comprise units of a siloxane-containing vinylic monomer, units of a hydrophobic vinylic monomer, units of a non-silicone vinylic crosslinker, units of a UV-absorbing vinylic monomer, or a combination thereof.

Any suitable siloxane-containing vinylic monomers can be used in the invention. A class of preferred siloxane-containing vinylic monomers is those containing a tris(trialkylsiloxy)silyl group or a bis(trialkylsilyloxy)alkylsilyl group. Examples of such preferred silicone-containing vinylic monomers include without limitation 3-acrylamidopropyl-bis(trimethylsiloxy)methylsilane, 3-N-methyl acrylamidopropylbis(trimethylsiloxy)methylsilane, N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl) propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophilized siloxane-containing vinylic monomers disclosed in U.S. Pat. Nos. 9,103,965, 9,475,827, and 9,097,840 (herein incorporated by references in their entireties) which comprise at least one hydrophilic linkage and/or at least one hydrophilic chain.

Another class of preferred siloxane-containing vinylic monomers is polycarbosiloxane vinylic monomers (or carbosiloxane vinylic monomers). Examples of such polycarbosiloxane vinylic monomers or macromers are those described in U.S. Pat. Nos. 7,915,323 and 8,420,711, in US Patent Application Publication Nos. 2012/244088, 2012/245249, 2015/0309211, and 2015/0309210 (herein incorporated by references in their entireties).

A further class of preferred siloxane-containing vinylic monomers is polydimethylsiloxane-containing vinylic monomers. Examples of such polydimethylsiloxane-containing vinylic monomers are mono-(meth)acryloyl-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane), mono-(meth)acrylamido-terminated polydimethylsiloxanes of various molecular weight, or combinations thereof.

In accordance with the invention, a siloxane-containing vinylic monomer is preferably 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloyl-terminated polydimethylsiloxanes of various molecular weight, mono-(meth)acrylamido-terminated polydimethylsiloxanes of various molecular weight, or a combination thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred non-silicone crosslinkers include without limitation tetraethyleneglycol di-(meth)acrylate, triethyleneglycol di-(meth)acrylate, diethyleneglycol di-(meth)acrylate, ethyleneglycol di-(meth)acrylate, tetraethyleneglycol divinyl ether, triethyleneglycol divinyl ether, diethyleneglycol divinyl ether, ethyleneglycol divinyl ether, trimethylopropane tri methacrylate, pentaerythritol tetramethacrylate, bisphenol A dimethacrylate, vinyl methacrylate, ethylenediamine di-(meth)acrylamide, glycerol dimethacrylate, triallyl isocyanurate, triallyl cyanurate, allyl (meth)acrylate, N-allyl-(meth)acrylamide, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl (meth)acrylate, vinyl glycidyl ether, allyl glycidyl ether, and combinations thereof), combinations thereof. A more preferred crosslinker is selected from the group consisting of tetra(ethyleneglycol) di-(meth)acrylate, tri(ethyleneglycol) di-(meth)acrylate, ethyleneglycol di-(meth)acrylate, di(ethyleneglycol) di -(meth)acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, triallyl isocyanurate, tetraethyleneglycol divinyl ether, triethyleneglycol divinyl ether, diethyleneglycol divinyl ether, ethyleneglycol divinyl ether, and combinations thereof.

Examples of preferred UV-absorbing vinylic monomers include without limitation: 2-(2-hydroxy-5-vinylphenyl)-

2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate, 2-hydroxy-5-methoxy-3-(5-methoxy-2H-benzo[d][1,2,3]triazol-2-yl)benzyl methacrylate, 3-(5-fluoro-2H-benzo[d][1,2,3]triazol-2-yl)-2-hydroxy-5-methoxybenzyl methacrylate, 3-(2H-benzo[d][1,2,3]triazol-2-yl)-2-hydroxy-5-methoxybenzyl methacrylate, 3-(5-chloro-2H-benzo[d][1,2,3]triazol-2-yl)-2-hydroxy-5-methoxybenzyl methacrylate, 2-hydroxy-5-methoxy-3-(5-methyl-2H-benzo[d][1,2,3]triazol-2-yl) benzyl methacrylate, 2-hydroxy-5-methyl-3-(5-(trifluoromethyl)-2H-benzo[d][1,2,3]triazol-2-yl)benzyl methacrylate, 4-allyl-2-(5-chloro-2H-benzo[d][1,2,3]triazol-2-yl)-6-methoxyphenyl, 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-, 2-(2'-hydroxy-5'-methacryloxyethylphenyl) benzotriazole (2-Propenoic acid, 2-methyl-, 2-[3-(2H-benzotriazol-2-yl)-4-hydroxyphenyl] ethyl ester, Norbloc), 2-{2'-Hydroxy-3'-tert-butyl-5'-[3'-methacryloyloxypropoxy]phenyl}-5-methoxy-2H-benzotriazole, 2-[2'-Hydroxy-3'-tert-butyl-5'-(3'-acryloyloxypropoxy)phenyl]-5-trifluoromethyl-2H-benzotriazole, 2-(2'-hydroxy-5-methacrylamidophenyl)-5-methoxybenzotriazole, 2-(3-allyl-2-hydroxy-5-methylphenyl)-2H-benzotriazole, 2-(2-Hydroxy-3-methallyl-5-methylphenyl)-2H-benzotriazole, 2-3'-t-butyl-2'-hydroxy-5'-(3"-dimethylvinylsilylpropoxy)-2'-hydroxyphenyl)-5-methoxybenzotriazole, 2-(2'-hydroxy-5'-methacryloylpropyl-3'-tert-butyl-phenyl)-5-methoxy-2H-benzotriazole, 2-(2'-hydroxy-5'-acryloylpropyl-3'-tert-butyl-phenyl)-5-methoxy-2H-benzotriazole, 2-Methylacrylic acid 3-[3-tert-butyl-5-(5-chlorobenzotriazol-2-yl)-4-hydroxyphenyl]-propyl ester (CAS#96478-15-8), 2-(3-(tert-butyl)-4-hydroxy-5-(5-methoxy-2H-benzo[d][1,2,3]triazol-2-yl) phenoxy)ethyl methacrylate; Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS#83063-87-0).

A silicone hydrogel contact lens can be prepared from a lens-forming composition according to a method of the invention which is another aspect of the invention.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises at least one amphiphilic branched polydiorganosiloxane macromer of the invention as described above and at least one free-radical initiator; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

In accordance with the invention, a free-radical initiator can be a thermal initiator or photoinitiator.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile) (AIBN), 1,1-azodiisobutyramidine, 1,1'-azo-bis (1-cyclohexanecarbonitrile), 2,2'-azo-bis(2,4-dimethyl-valeronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

In accordance with the invention, the lens-forming composition can further comprise other components, such as, a siloxane-containing vinylic monomer, a hydrophilic vinylic monomer, a hydrophobic vinylic monomer, a non-silicone vinylic crosslinker, a UV-absorbing vinylic monomer, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Various embodiments of an amphiphilic branched polydiorganosiloxane macromer of the invention, a siloxane-containing vinylic monomer, a hydrophobic vinylic monomer, a UV-absorbing vinylic monomer, and a non-silicone vinylic crosslinker are described above for the aspects of the invention and should be incorporated into this aspect of the invention.

Examples of preferred hydrophilic vinylic monomers include without limitation N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a number average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof. Preferably, the hydrophilic vinylic monomer is a hydrophilic N-vinyl monomer, such as, N-vinylpyrrolidone, N-vinyl-N-methyl acetamide, N-vinyl formamide, N-vinyl acetamide, N-vinyl isopropylamide, or combinations thereof. Even more preferably, the hydrophilic vinylic monomer is N-vinylpyrrolidone, N-vinyl-N-methyl acetamide, or combinations thereof.

In a preferred embodiment, the lens-forming composition further comprises a hydrophilic N-vinyl monomer. More preferably, the hydrophilic N-vinyl monomer is N-vinylpyrrolidone, N-vinyl-N-methyl acetamide, N-vinyl formamide, N-vinyl acetamide, N-vinyl isopropylamide, or combinations thereof; even more preferably is N-vinylpyrrolidone, N-vinyl-N-methyl acetamide, or combinations thereof.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

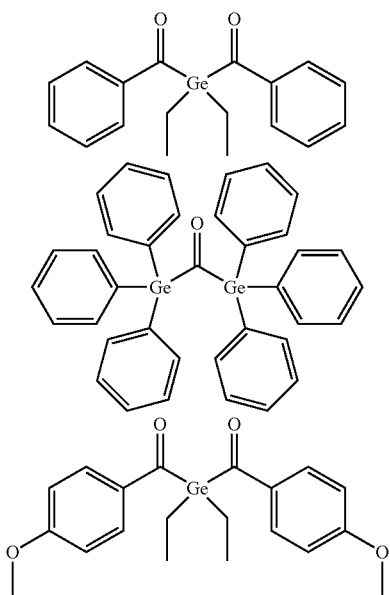

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-dimethylacrylamide, polyacrylic acid, poly 2 ethyl oxazoline, heparin polysaccharides, polysaccharides, and mixtures thereof. The number average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In a preferred embodiment, the lens-forming composition comprises an organic solvent.

Example of suitable solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2- methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a particular preferred embodiment, a lens-forming composition is a solution of all the desirable components dissolved in 1,2-propylene glycol, a polyethyleneglycol having a molecular weight of about 400 Daltons or less, or a mixture thereof.

In another preferred embodiment, the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the lens-forming composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

The previous disclosure will enable one having ordinary skill in the art to practice the invention. Various modifications, variations, and combinations can be made to the various embodiment described herein.

What is claimed is:

1. A silicone hydrogel contact lens, comprising a crosslinked polymeric material which comprises units of an amphiphilic branched polydiorganosiloxane macromer, wherein the amphiphilic branched polydiorganosiloxane macromer comprises:
    (1) at least first polydiorganosiloxane polymer chain having two terminal methacryloyl groups; and
    (2) at least one first hydrophilic chain;
    (3) at least one second hydrophilic polymer chain; and
    (4) at least one second polydiorganosiloxane polymer chain at least one end of which is covalently connected to the second hydrophilic polymer chain,
    wherein the first and second polydiorganosiloxane chains are derived from an α,ω-dimethacryloyl-terminated polydiorganosiloxane vinylic crosslinker comprising one or more ATRP-containing siloxane units having one substituent having an ATRP initiator, wherein the first hydrophilic chain is anchored covalently onto one single ATRP-containing siloxane unit of the first or second polydiorganosiloxane chain at one of the two ends of the first hydrophilic polymer chain and has one first terminal group at the other one of the two ends of the first hydrophilic polymer chain,
    wherein the second hydrophilic polymer chain is (a) anchored covalently onto one single ATRP-containing siloxane unit of the first polydiorganosiloxane chain at one of the two ends of the second hydrophilic polymer chain, (b) has one second terminal group at the other one of the two ends of the second hydrophilic polymer chain, and (c) is covalently connected to covalently connected to one of the two ends of the second polydiorganosiloxane chain,
    wherein the first and second terminal groups independent of each other are (meth)acryloxy group, (meth)acryloxy-$C_2$-$C_4$ alkoxy group, (meth)acrylamido-$C_2$-$C_4$ alkoxy group, (meth)acryloxy-$C_2$-$C_4$ alkylamino group, (meth)acrylamido-$C_2$-$C_4$ alkylamino group, $C_1$-$C_6$ substituted or unsubstituted alkoxy group, $C_2$-$C_6$ substituted or unsubstituted alkanoyloxy group, or $C_1$-$C_6$ substituted or unsubstituted alkylamino group, wherein the first and second hydrophilic polymer chains are composed of monomeric units of at least one hydrophilic vinylic monomer selected from the group consisting of (meth)acrylamide, N,N-dimethyl (meth) acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, hydroxyethyl (meth)acrylate, hydroxyethyl (meth)acrylamide, hydroxypropyl (meth)acrylamide, glycerol methacrylate, polyethylene glycol (meth)acrylate, polyethylene glycol $C_1$-$C_4$-alkyl ether (meth)acrylate having a number average molecular weight of up to 1500, and mixtures thereof,
    wherein the silicone hydrogel contact lens, when being fully hydrated, has an oxygen permeability (Dk) of at least about 70 barrers, a water content of from about 25% to about 70% by weight, an elastic modulus of from about 0.20 MPa to about 1.2 MPa.

2. The silicone hydrogel contact lens of claim 1, wherein the first and second hydrophilic polymr chains are composed of monomeric units of at least one hydrophilic vinylic monomer selected from the group consisting of selected from the group consisting of N,N-dimethyl (meth)acrylamide, (meth)acrylamide, N-vinyl-N-methyl acetamide, N-vinylpyrrolidone, hydroxyethyl (meth)acrylate, hydroxyethyl (meth)acrylamide, glycerol methacrylate, polyethylene glycol $C_1$-$C_4$-alkyl ether (meth)acrylate having a number average molecular weight of up to 1500, and combinations thereof.

3. The silicone hydrogel contact lens of claim 2, wherein the α,ω-dimethacryloxy-terminated polydiorganosiloxane vinylic crosslinker comprising one or more ATRP-containing siloxane units having one substituent having an ATRP initiator has formula (1)

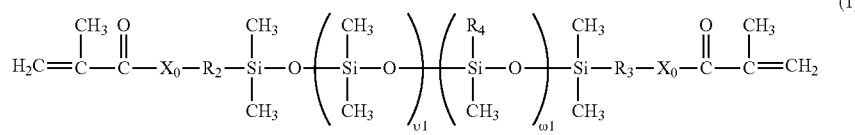

in which: $X_0$ is O or NR' in which R' is hydrogel or $C_1$-$C_{10}$ alkyl, $\upsilon 1$ is an integer of from 30 to 500 and $\omega 1$ is an integer of from 1 to 75, provided that $\omega 1/\upsilon 1$ is from about 0.003 to about 0.20; $R_2$ and $R_3$ independently of each other are a substituted or unsubstituted $C_2$-$C_6$ alkylene divalent radical or a divalent radical of —$R_5$—O—$R_6$— in which $R_5$ and $R_6$ independently of each other are a substituted or unsubstituted $C_2$-$C_6$ alkylene divalent radical; $R_4$ is of formula (2) or (3)

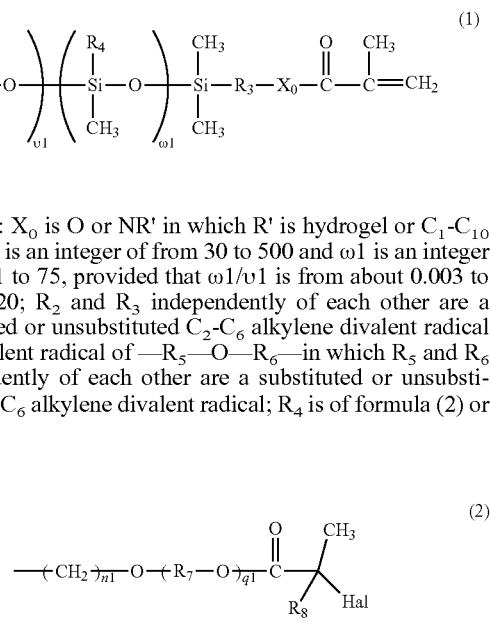

in which: q1 is zero or 1; n1 is an integer of 3 to 9; $R_7$ is $C_2$-$C_6$ substituted or unsubstituted alkylene diradical; $R_8$ and $R_9$ independent of each other are hydrogen or methyl; Hal is Cl or Br.

4. The silicone hydrogel contact lens of claim 1, wherein the α,ω-dimethacryloxy-terminated polydiorganosiloxane vinylic crosslinker comprising one or more ATRP-containing siloxane units having one substituent having an ATRP initiator has formula (1)

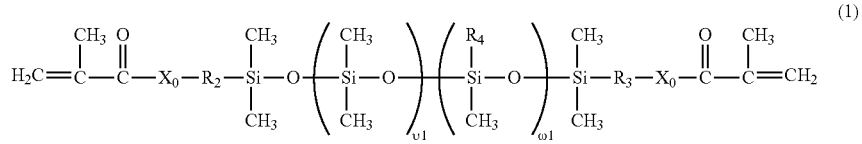

(1)

in which: $X_0$ is O or NR' in which R' is hydrogel or $C_1$-$C_{10}$ alkyl, $\upsilon 1$ is an integer of from 30 to 500 and $\omega 1$ is an integer of from 1 to 75, provided that $\omega 1/\upsilon 1$ is from about 0.003 to about 0.20; $R_2$ and $R_3$ independently of each other are a substituted or unsubstituted $C_2$-$C_6$ alkylene divalent radical or a divalent radical of —$R_5$—O—$R_6$—in which $R_5$ and $R_6$ independently of each other are a substituted or unsubstituted $C_2$-$C_6$ alkylene divalent radical; $R_4$ is of formula (2) or (3)

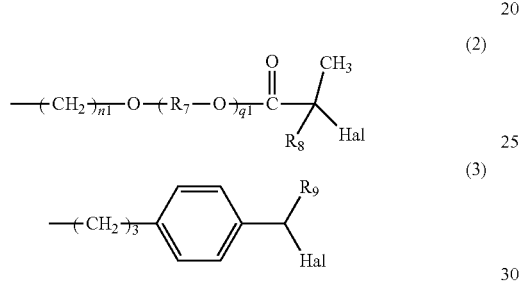

(2)

(3)

in which: q1 is zero or 1; n1 is an integer of 3 to 9; $R_7$ is $C_2$-$C_6$ substituted or unsubstituted alkylene diradical; $R_8$ and $R_9$ independent of each other are hydrogen or methyl; Hal is Cl or Br.

5. A method for producing silicone hydrogel contact lenses, comprising the steps of:
preparing a lens-forming composition which is clear at room temperature and optionally at a temperature of from about 0 to about 4° C., wherein the lens-forming composition comprises at least one amphiphilic branched polydiorganosiloxane macromer and at least one free-radical initiator, wherein the amphiphilic branched polydiorganosiloxane macromer comprises (1) at least first polydiorganosiloxane polymer chain having two terminal methacryloyl groups, (2) at least one first hydrophilic chain, (3) at least one second hydrophilic polymer chain, and (4) at least one second polydiorganosiloxane polymer chain at least one end of which is covalently connected to the second hydrophilic polymer chain, wherein the first and second polydiorganosiloxane chains are derived from an α,ω-dimethacryloyl-terminated polydiorganosiloxane vinylic crosslinker comprising one or more ATRP-containing siloxane units having one substituent having an ATRP initiator, wherein the first hydrophilic chain is anchored covalently onto one single ATRP-containing siloxane unit of the first or second polydiorganosiloxane chain at one of the two ends of the first hydrophilic polymer chain and has one first terminal group at the other one of the two ends of the first hydrophilic polymer chain, wherein the second hydrophilic polymer chain is (a) anchored covalently onto one single ATRP-containing siloxane unit of the first polydiorganosiloxane chain at one of the two ends of the second hydrophilic polymer chain, (b) has one second terminal group at the other one of the two ends of the second hydrophilic polymer chain, and (c) is covalently connected to covalently connected to one of the two ends of the second polydiorganosiloxane chain, wherein the first and second terminal groups independent of each other are (meth)acryloxy group, (meth)acryloxy-$C_2$-$C_4$ alkoxy group, (meth)acrylamido-$C_2$-$C_4$ alkoxy group, (meth)acryloxy-$C_2$-$C_4$ alkylamino group, (meth)acrylamido-$C_2$-$C_4$ alkylamino group, $C_1$-$C_6$ substituted or unsubstituted alkoxy group, $C_2$-$C_6$ substituted or unsubstituted alkanoyloxy group, or $C_1$-$C_6$ substituted or unsubstituted alkylamino group, wherein the first and second hydrophilic polymer chains are composed of monomeric units of at least one hydrophilic vinylic monomer selected from the group consisting of (meth)acrylamide, N,N-dimethyl (meth)acrylamide, dimethylaminoethyl (meth)acrylate, di methylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, hydroxyethyl (meth)acrylate, hydroxyethyl (meth)acrylamide, hydroxypropyl (meth)acrylamide, glycerol methacrylate, polyethylene glycol (meth)acrylate, polyethylene glycol $C_1$-$C_4$-alkyl ether (meth)acrylate having a number average molecular weight of up to 1500, and mixtures thereof;
introducing the lens-forming compositon into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and curing thermally or actinically the lens-forming composition in the lens mold to form a silicone hydrogel contact lens,
wherein the silicone hydrogel contact lens has an oxygen permeability (Dk) of at least about 70 barrers, a water content of from about 25% to about 70% by weight, an elastic modulus of from about 0.2 MPa to about 1.2 M Pa.

6. The method of claim 5, wherein the lens-forming composition further comprises a siloxane-containing vinylic monomer, a hydrophilic vinylic monomer, a hydrophobic vinylic monomer, a non-silicone vinylic crosslinker, a UV-absorbing vinylic monomer, a visibility tinting agent, antimicrobial agents, a bioactive agent, leachable lubricants, leachable tear-stabilizing agents, and mixtures thereof.

7. The method of claim 5, wherein the lens-forming composition comprises a siloxane-containing vinylic monomer.

8. The method of claim 7, wherein the siloxane-containing vinylic monomer is 3-(meth)acryloxy-2-hydroxypropyloxy)propylbis(trimethylsiloxy)methylsilane, 3-(meth)acryloxyethoxypropyloxypropylbis(trimethylsiloxy) methylsilane, 3-(meth)acrylamidopropyl-bis (trimethylsiloxy)methylsilane, 3-N-methyl (meth)

acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

9. The method of claim 5, wherein the lens-forming composition comprises a hydrophilic vinylic monomer.

10. The method of claim 9, wherein hydrophilic vinylic monomer is a hydrophilic N-vinyl monomer.

11. The method of claim 10, wherein the hydrophilic N-vinyl monomer is N-vinylpyrrolidone, N-vinyl-N-methyl acetamide, or combinations thereof.

12. The method of claim 5, wherein the lens-forming composition comprises a non-silicone vinylic crosslinker.

13. The method of claim 5, wherein the non-silicone vinylic crosslinker is tetra(ethyleneglycol) di-(meth)acrylate, tri(ethyleneglycol) di-(meth)acrylate, ethyleneglycol di-(meth)acrylate, di(ethyleneglycol) di-(meth)acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, triallyl isocyanurate, tetraethyleneglycol divinyl ether, triethyleneglycol divinyl ether, diethyleneglycol divinyl ether, ethyleneglycol divinyl ether, or combinations thereof.

14. The method of claim 5, wherein the lens-forming composition is a solution of all the desirable components dissolved in 1,2-propylene glycol, a polyethyleneglycol having a molecular weight of about 400 Daltons or less, or a mixture thereof.

15. The method of claim 5, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof.

16. The method of claim 5, wherein the step of curing is carried out thermally.

* * * * *